April 10, 1945.    R. BRUNKEN    2,373,453
AUTOMATIC GEAR SHIFTING MECHANISM FOR TRANSMISSIONS
Filed March 27, 1942    5 Sheets-Sheet 1
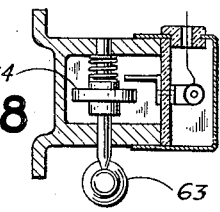
FIG.-8
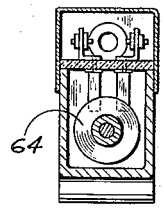
FIG.-9
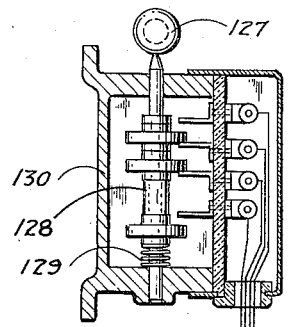
FIG.-7
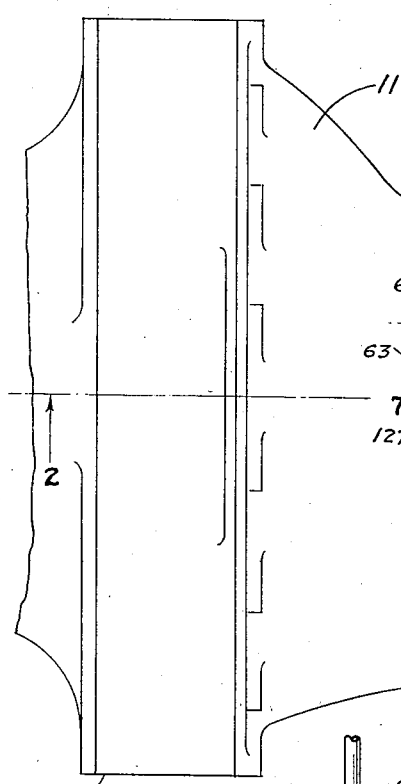
FIG.-1
FIG.-5
FIG.-12
INVENTOR.
RENKE BRUNKEN
ATTORNEYS.

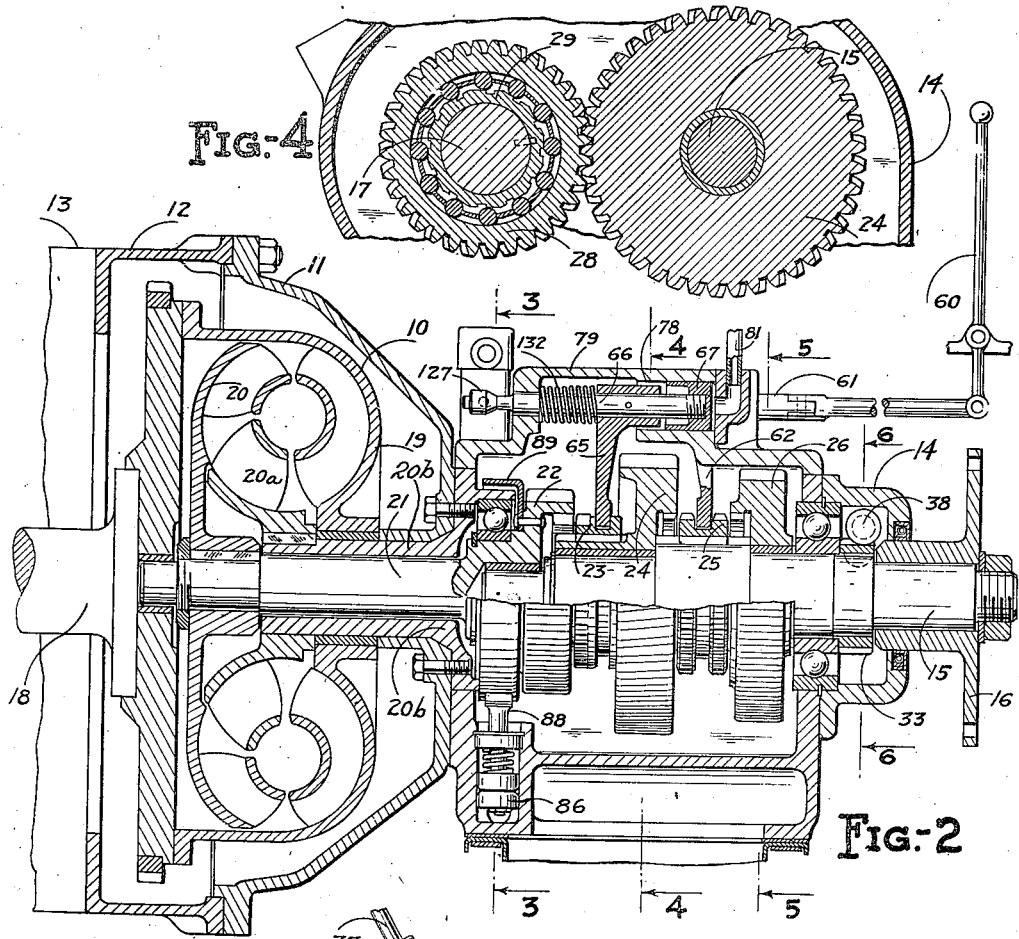
Fig.-4
Fig.-2
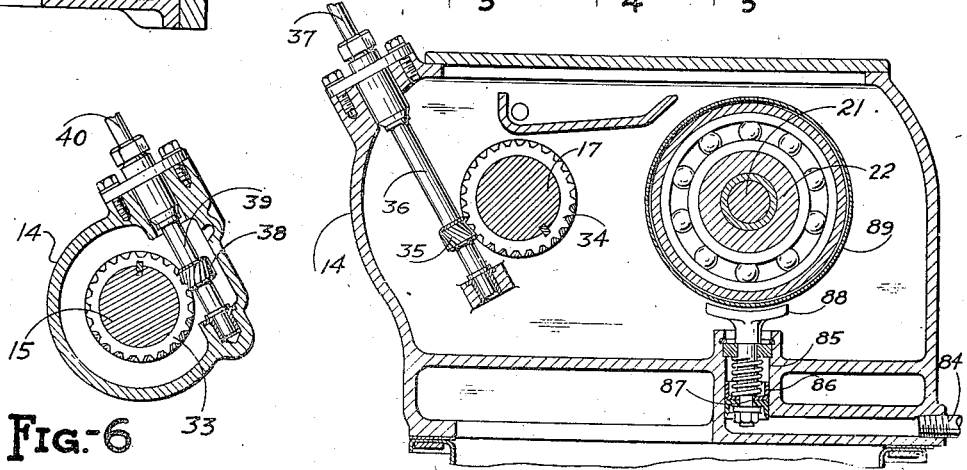
Fig.-6
Fig.-3
INVENTOR.
RENKE BRUNKEN
BY
ATTORNEYS.

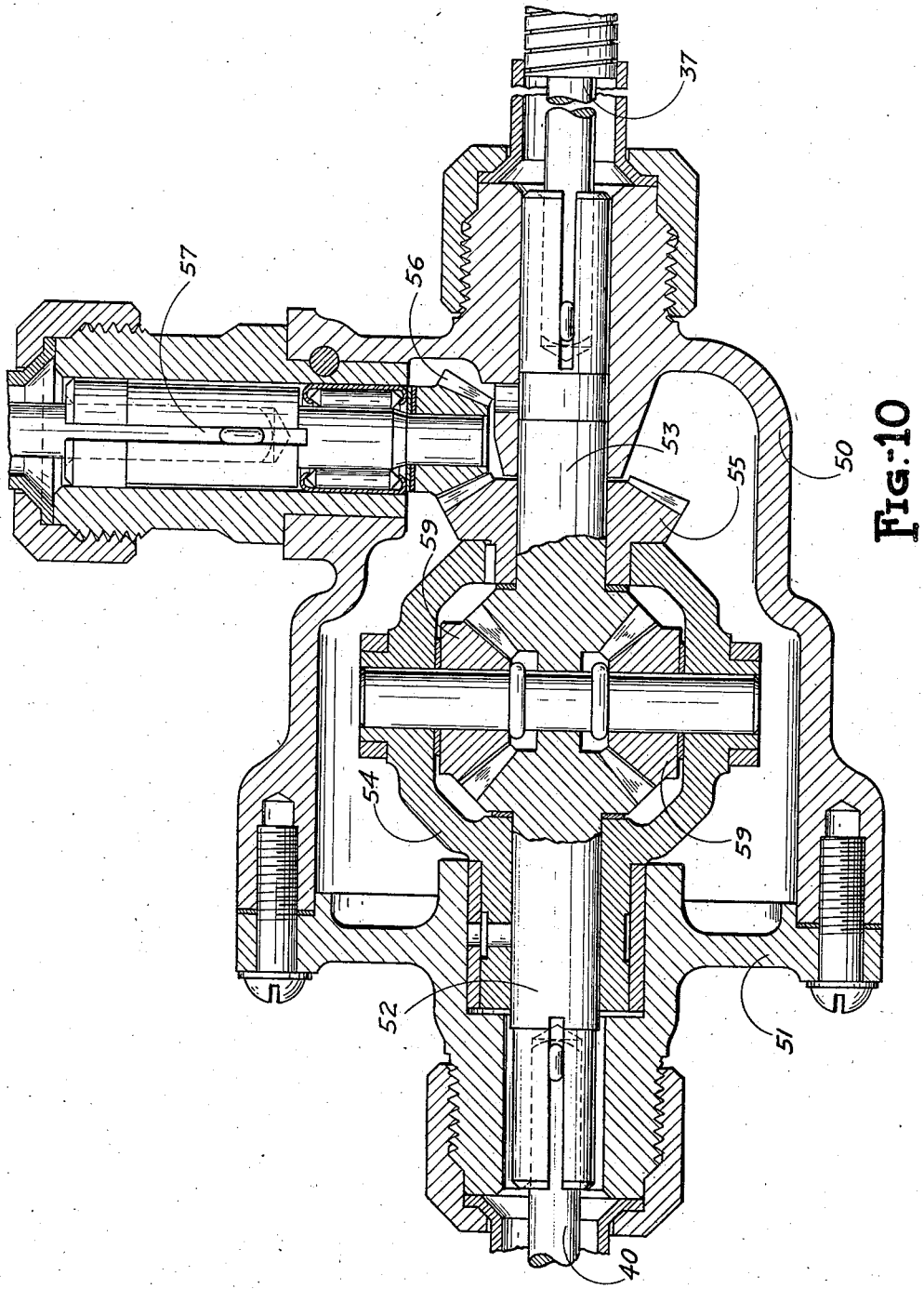

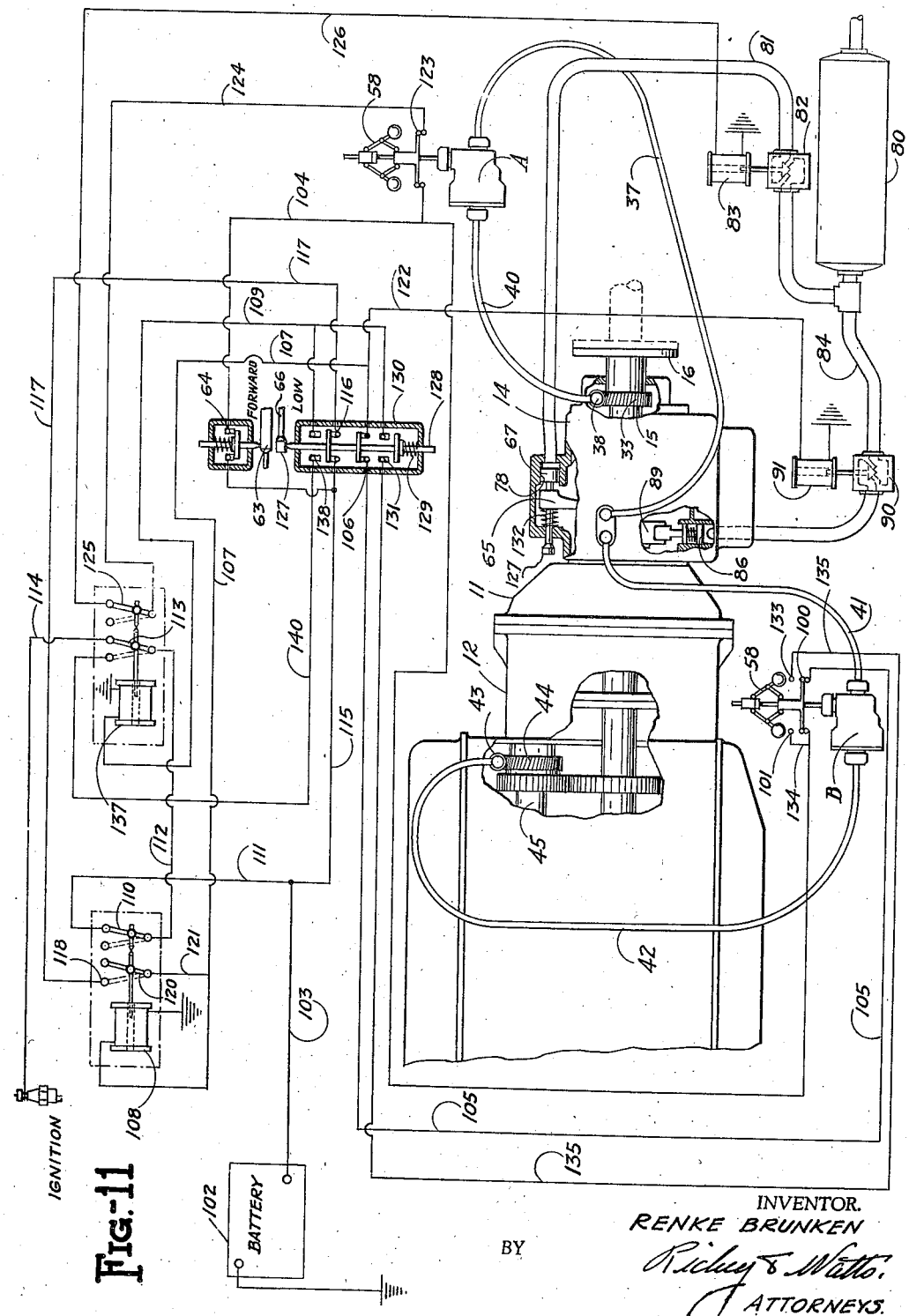

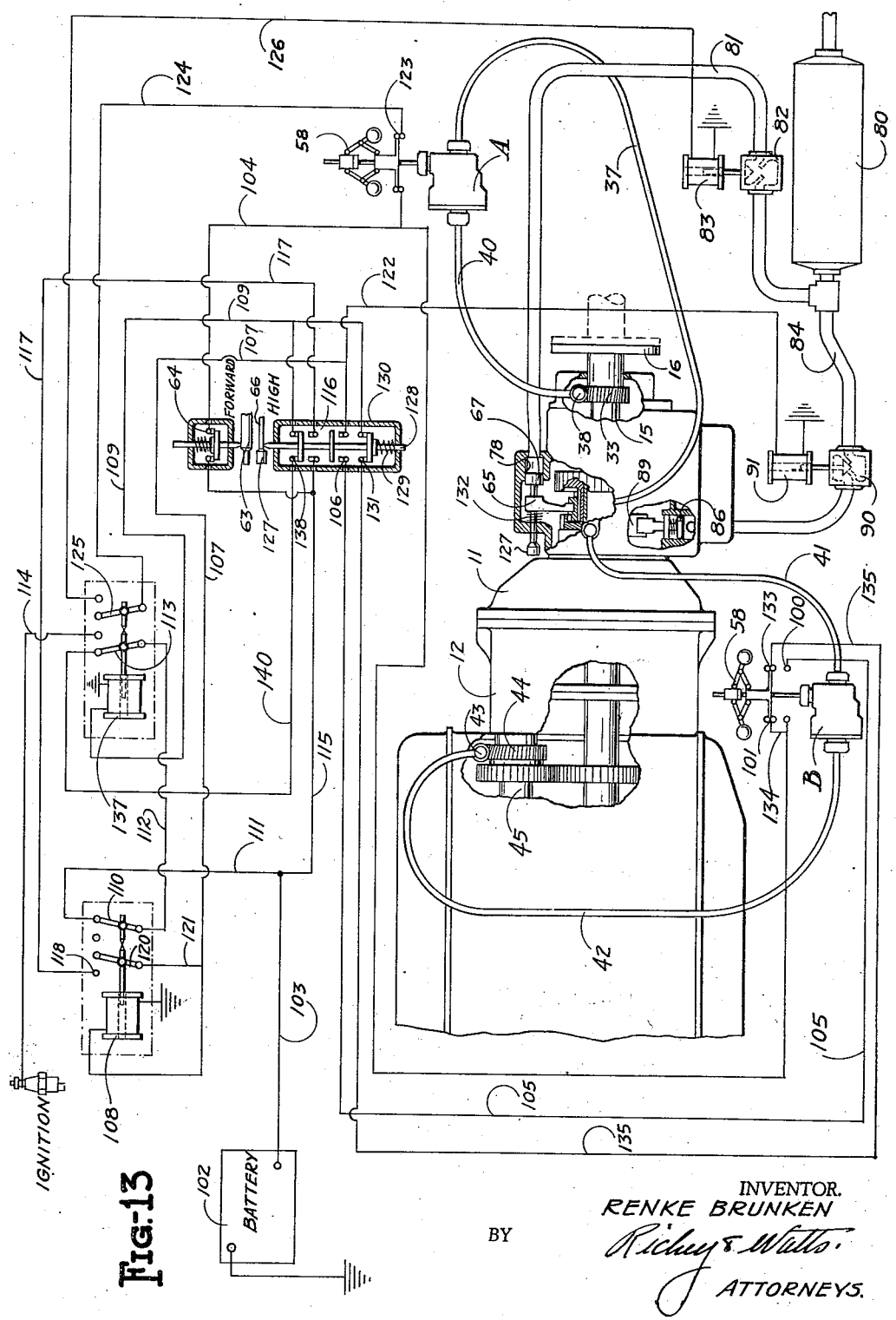

Patented Apr. 10, 1945

2,373,453

UNITED STATES PATENT OFFICE 2,373,453

AUTOMATIC GEAR SHIFTING MECHANISM FOR TRANSMISSIONS

Renke Brunken, Shaker Heights, Ohio

Application March 27, 1942, Serial No. 436,443

22 Claims. (Cl. 74—189.5)

This invention relates broadly to transmissions of the type commercially known as hydraulic torque converters and fluid couplings and more specifically to mechanism for shifting change speed gears employed in conjunction therewith.

One of the objects of the invention is to utilize the speed differential as it occurs between the engine and the turbine of a hydraulic torque converter or fluid coupling as the medium for controlling the gear shift mechanism of a gear train associated therewith.

Another object of the invention is to provide instrumentalities for synchronizing the gears in a transmission and for effecting an automatic interengagement of the high and low gears embodied therein.

Another object of the invention is to control the gear shift operation through an electric switch which is operated by the differential in speed between the driving and driven members in a fluid transmission. To this end the invention contemplates a differential gear unit, a governor coupled therewith, and a switch operatively connected with the governor, the gear unit being adapted to drive the governor at the rotative speed difference between the engine and turbine.

Another object of the invention is to provide mechanism for interrupting the engine ignition circuit when the engine and turbine reach a predetermined speed difference and to reestablish such circuit when the engine and turbine reach certain other predetermined speed differences.

Another object of the invention is to provide mechanism for automatically shifting the transmission gears from low to high and from high to low concomitant with the road resistance and to effect such operations through a control set governed by the speed variations between the engine and turbine.

Other objects and advantages more or less ancillary to the foregoing and the manner in which all the various objects are realized will appear in the following description, which considered in connection with the accompanying drawings, sets forth the preferred embodiment of the invention.

In order to illustrate the use and manner of application of the invention with one of the commercial forms of fluid transmissions, the improved gear shift mechanism is shown herein as associated with a so called hydraulic torque converter which is provided with a two speed transmission gear set.

When a fluid drive mechanism of the above character is subjected to severe torque loads the engine R. P. M. is high and the speed of the turbine low, when, however, the torque loads are reduced the engine and turbine will attain equal speeds. The office of the mechanisms constituting the present invention is to effect the requisite gear shift operation under the above conditions, that is to shift the gears from low to high under low torque loads and comparatively low differential speed between engine and turbine and shift the gears from high to low under increased torque loads and high differential speed between engine and turbine. The automatic actuation of the gear shift mechanism is obtained through a differential gear unit organized to operate a system of electromagnetic switches, in response to the rotative speed difference between the engine and turbine and arranged further for operation when and only when a governor coordinated with the gear unit attains certain predetermined speeds.

In the accompanying drawings, the engine, hydraulic torque converter and geared transmission unit are of a type primarily adapted for use in an automotive vehicle. It is to be understood, however, that such elements are chosen herein merely for the purpose of illustration and that the invention is susceptible for use with other forms of mechanisms and in other environs where speed variations are a function of the torque variations between the driving and driven members of the machine.

Referring to the drawings:

Fig. 1 is a plan view of a hydraulic drive unit and change speed gear set, the housing for the transmission gearing being broken away and shown in section in the interest of clarity;

Fig. 2 is a vertical section through the medial axis thereof, the section being taken on a plane indicated by the line 2—2 in Fig. 1;

Fig. 3 is a transverse section through a portion of the transmission gearing illustrated in Fig. 2, the section being taken on a plane indicated by the line 3—3 in Fig. 2;

Fig. 4 is another transverse section through a fragmentary portion of the transmission shown in Fig. 2, the section being taken on a plane indicated by the line 4—4 in Fig. 2;

Fig. 5 is a transverse section through a fragmentary portion of the transmission gearing, the section being taken on a plane indicated by the line 5—5 in Fig. 2;

Fig. 6 is a transverse section through the transmission, the section being taken on a plane indicated by the line 6—6 in Fig. 2;

Fig. 7 is a vertical section through a portion of one of the electrical control units mounted on the transmission housing, the section being taken on a plane indicated by the line 7—7 in Fig. 1;

Fig. 8 is a vertical section through another of the electrical control units mounted on the transmission housing, the section being taken on the plane indicated by the line 8—8 in Fig. 1;

Fig. 9 is a transverse section through the electrical control switch illustrated in Fig. 8, the section being taken on the plane indicated by the line 9—9 in Fig. 1;

Fig. 10 is a longitudinal section of the speed responsive mechanism embodying one of the elements of the improved control mechanism;

Fig. 11 is a diagrammatic view of the engine, transmission and gear shift control mechanisms associated therewith including the wiring diagram therefor;

Fig. 12 is a view in perspective of an alternate form of mechanism for restricting the R. P. M. of the engine; and Fig. 13 is a diagrammatic view of the mechanism illustrated in Fig. 11, certain of the members being shown in an actuated position.

As shown in Figs. 1 and 2, the hydraulic torque converter or fluid coupling 10 is mounted in a housing 11 coupled with the fly wheel bell housing 12 constituting a portion of the engine 13. The transmission gearing 14 is coupled with the hydraulic torque converter 10 and comprises, generally, a main shaft 15 having gears thereon and a propeller shaft companion flange 16 on the outer end thereof. The gears are entrained in the usual manner, with a second set of gears mounted on a countershaft 17, the gear set being designed to provide a two speed transmission unit.

The driving connection from the engine crankshaft 18 (Fig. 2) embodies a pump driving member 19, a turbine driven member 20 keyed to a shaft 21 and a reaction member 20a keyed to a sleeve 20b surrounding the shaft 21 and affixed to the housing 11. The end of the shaft 21 is provided with a gear 22, the central portion of which is recessed to provide a pilot bearing for the reduced end of the shaft 15. The gear 22 is formed with internal teeth adapted for engagement with a dog clutch 23 mounted for sliding, reciprocative movement upon the splined hub portion of a gear 24 which is freely rotatable upon the shaft 15. The outer face of the gear 24 is formed with internal teeth adapted for engagement with a dog clutch 25 mounted upon a splined portion of the shaft 15. The circumferential face of the clutch 25 is formed with teeth which are designed for engagement with an internal gear 26 freely rotatable upon the shaft 15. The gear 22 is intermeshed with a gear 27, Fig. 1, keyed to the countershaft 17 and the gear 24 is intermeshed with a gear 28, having a roller ratchet bearing 29, Fig. 4, therein which is keyed upon the shaft 17. The gear 26 is intermeshed with an idler gear 30 (see Fig. 5) mounted upon a shaft 31, the idler being engaged with a reverse gear 32 keyed upon the shaft 17.

In operation high speed drive is effected through interengagement of the clutch 23 with the gear 22, which, as will be seen in Fig. 2, connects the shaft 21 with the shaft 15, inasmuch as the gear 24 is always in engagement with the clutch 25 during all forward driving combinations. Although the gear 27 is in constant mesh with the gear 22, the gear 28 is free to override the ratchet 29 when the clutch 23 is engaged and thus prevent transmission of power through the gear 24. Low gear drive is effected through interengagement of the clutch 25 with the gear 24, the transmission of power in this event being effected through the shaft 21, the gears 22, 27 through the ratchet 29 to the gear 24, thence through the clutch element to the shaft 15. Reverse gear drive is effected through the interengagement of the clutch 25 with the gear 26, the idler gear 30 and the gear 32 on the countershaft which is driven through the intermeshed gears 22 and 27.

Inasmuch as the transmission gearing per se forms no part of the present invention further description thereof is deemed unnecessary herein save that a worm wheel 33 providing the power take-off for the speed responsive mechanism is provided upon the shaft 15 and a similar worm wheel 34, Fig. 3, providing a second power take-off for the speed responsive mechanism is mounted upon the countershaft 17.

As will be seen in Figs. 3 and 6, the worm wheel 34 is intermeshed with the worm wheel 35 mounted on the shaft 36 journalled in the housing of the transmission 14. The outer end of the shaft is coupled with a flexible cable 37 operatively connected with the gearing in the differential gear unit or speed responsive mechanism A, Fig. 10. The worm wheel 33 is interengaged with a worm 38 mounted on a shaft 39 journalled in the transmission housing and coupled with a flexible shaft 40 operatively connected with a second gear unit in the speed responsive mechanism A. The cable 37 is provided with gearing for the transmission of power to a flexible cable 41, Fig. 11, operatively connected with the gears in a speed responsive mechanism B which is similar to the speed responsive mechanism A. The secondary gearing in the speed responsive unit B is driven through a flexible cable 42 coupled with a worm 43 intermeshed with the worm wheel 44 mounted on the engine cam shaft 45.

The speed responsive mechanisms A and B, illustrated in Fig. 10, comprise a housing 50 having a cover plate 51 thereon which is line bored with the housing for the reception of a pair of axially aligned beveled pinions 52 and 53. The pinion 52 is connected in the instrument A with the flexible cable 40 and in the instrument B with the cable 42 while the pinion 53 is coupled with either the flexible cable 37 or 41. The shank of the pinion 52 is journalled in a gear cage 54 mounted for free rotative movement in a housing in the end plate 51 and further supported by the hub portion of a miter gear 55 which in turn is journalled upon the shank of the pinion 53. The miter gear 55 is intermeshed with a pinion 56 having the shank thereof keyed to a shaft 57 constituting the stem of a governor 58 illustrated in Fig. 11. The gear ratio between the worms and worm wheels described above are designed to develop rotative speeds of the cables 37, 41, 40 and 42, which are proportional to the R. P. M. of the engine, turbine and propeller shafts respectively. Thus when the engine and turbine are rotated at equal speeds, such for example as when the engine output and road load resistance are equal the pinions 52 and 53 will merely race about the bevel gears 59 in the gear cage 54. When, however, engine and turbine speed variations occur consequent higher road resistance or other torque loads demanding low gear operation the bevel pinion 52 will be rotated at a different rate of speed than the pinion 53 and thus effect the rotation of the gear cage 54 through the bevel gears 59, the rotation of the miter gear 55, and the consequent operation of the governor 58. As a sleeve on the governor stem is reciprocated it will open or close the electrical switches coordinated therewith which in turn control the instrumentalities for shifting the gears in the transmission change speed gear unit.

As will be seen in Figs. 1, 2 and 11, the transmission is provided with a gear shift lever 60, interlinked with a rod 61 having a clutch shifting yoke 62 thereon which is engaged with the sliding clutch 25. Actuation of the gear shift lever 60 facilitates adjustment of the clutch in neutral position, engagement with the gear 24 for forward drive or engagement with the gear 26 for reverse drive. The free end of the rod 61 is formed with a tapered shoulder constituting a cam 63 disposed to actuate an electrical switch 64 which closes an electrical circuit to the gear shift operating mechanisms when the gears are shifted to the forward drive position. The diametrically reduced portion of the rod is disposed to operate the switch for breaking the circuit to the gear shift operating mechanisms when the gears are adjusted in neutral or reverse drive position.

The clutch 23, Fig. 2, is actuated by a yoke 65 mounted on a rod 66 having a piston 67 on an end thereof. The piston is mounted for reciprocating movement within a cylinder 78 formed in the housing 79 which also supports the gear shift yoke rods 61 and 66. The cylinder 78 is connected with a compressed air tank 80 through a conduit 81, Fig. 11, which is provided with a valve 82 operated by a solenoid 83 controlled by the electric switch associated with the governor 58. The conduit 81 is provided with a T connection having a second conduit 84 coupled therewith which is in fluid communication with a cylinder 85 in the transmission housing 14. The cylinder 85 is machined for the reception of a piston 86, Fig. 3, mounted upon a rod 87 having a brake shoe 88 upon the end portion thereof. The brake shoe is adapted for engagement with a brake drum 89 affixed to the gear 22. The conduit 84 is provided with a valve 90 which is actuated by a solenoid 91 controlled by the switch associated with the governor 58.

The automatic gear shift operation from low to high is effectuated through the electric actuating devices controlled by the governor 58.

As will be seen in Fig. 11, the governor 58 for the speed responsive mechanism B is provided with a pair of switches 100 and 133, the former being arranged to close when the governor is inactive as occurs when the speed of the engine and turbine are equal, the latter being arranged for operation when the governor is biased by a predetermined difference in the speed of the engine and turbine. The switch 100 controls the operation of the gear shift mechanism from low to high and the switch 101 controls the gear shift operation from high to low, the governor as actuated by the speed responsive mechanism in either case effecting the operation of the switches to make and break the electric circuits.

Tracing the operation of the gear shift from low to high, current from the battery 102 reaches one pole of the switch 100 through the line 103, the switch 64 and the line 104. The current then flows through the second pole of the switch 100, the line 105, through a switch 106, to the line 107 which is coupled with a solenoid 108. As the current energizes the solenoid 108, the core therein will be retracted drawing the switch arm 110 into the position indicated by dotted lines, thus breaking the current in the line 111, switch 110, line 112, switch 113 and the ignition line 114. As the ignition circuit is interrupted the R. P. M. of the engine will drop, thus changing the speed of the engine and turbine. During this period, however, the operation of the solenoid 108 is delayed through a secondary circuit which is excited from the battery through the lines 103 and 115 through a switch 116 (closed contemporaneous the operation of the switch 106) and through the line 117 which leads to a contact point 118 associated with the solenoid 108. From the contact point 118 the current will flow through a switch 120 (now closed) and through a line 121 connected with the line 107 which completes the circuit and holds the solenoid in its actuated position. Simultaneous the operation of the solenoid 108 the current flowing through the switch 106 will flow through the line 122 to the solenoid 91, effecting the operation thereof and consequent actuation of the valve in the conduit 84. As the valve 90 is opened the compressed fluid in the reservoir 80 will cause the actuation of the brake shoe 88 and retard the movement of the turbine brake drum 89 until the propeller shaft and turbine are synchronized.

The gear shift operation is effected when the propeller shaft and turbine are in phase through the speed responsive mechanism A, which is coupled through the cable 40 with the driven shaft 15 and the turbine through the flexible shaft 37. As the propeller shaft and in turn the shaft 15 attain equal speeds the governor 58 will effect the closure of the switch 123 which is connected with the battery through the lines 104, the switch 64 and the line 103 and also coupled to the solenoid 83 through a line 124, the switch 125 and a line 126. When the solenoid 83 is energized it will open the valve 82 admitting compressed fluid from the reservoir 80 to the cylinder 78, thus causing the actuation of the piston 67 and consequent translation of the yoke 65 which effects the intermeshed relation of the clutch 23 with the gear 22. During this operation the cam 127 on the free end of the rod 66 will be moved outwardly so that the switch plunger 128 under the influence of a spring 129 in the junction box 130 will engage the reduced diameter of the rod 66 and thus elevate the contacts of the switches 106 and 116 to circuit breaking position and the contacts of the switch 131 to circuit closing position.

The switches coordinated with the governors 58 are constructed with adjustable contact points to accommodate modification of the timed operation of the switches or the relative order of operation of the switches associated with the speed responsive mechanisms A and B.

The gear shift operation from high to low is effectuated by relieving the fluid pressure against the piston 67 so that the spring 132 intermediate the arm 65 and housing 79 will cause the retraction of the rod 66 and consequent disengagement of the clutch 23 with the gear 22. In this cycle of operation the synchronization of the gears is unnecessary since the torque converter or fluid drive medium performs this function.

Tracing the gear shift operation from high to low in the diagrammatic views shown in Figs. 11 and 13, a switch 133 coordinated with the governor 58 and the speed responsive mechanism B will be closed by the operation of the governor when the turbine is rotated at a predetermined lower rate of speed than the engine. Closure of the switch 133 will permit the current to flow from the battery through the lines 103, 115, the switch 64, the line 104 and line 134 to one pole of the switch and through the line 135 through the switch 131 (Fig. 13) through the line 109 to a solenoid 137 which causes the retraction of the core and the movement of the switches 113 and 125. As the switch 113 is actuated the circuit to the engine ignition is interrupted and at the same time the circuit through the line 126 to the solenoid 83 is broken, thus causing the closure of the valve 82 and the release of the fluid pressure in the line 81 and cylinder 78.

Interruption of the ignition circuit will cause the deceleration of the engine and thereby effect a momentary torque reversal which will permit the spring 132 to move the yoke 65 into the position where the clutch 23 will be disengaged from the gear 22, thus effecting the interengagement of the change speed gears for low speed drive.

During the gear shift operation from low to high, the piston 67 moved outwardly from the position illustrated in Fig. 11 to the position shown in Fig. 13 and the plunger 128 fell from the cam 127 to the recessed portion of the rod 66, thus causing the closure of the switches 131 and 138.

Bearing in mind that closure of the switch 133 interrupts the ignition circuit and effectuates a speed variation between the driving elements for the governor 58, it will be recognized that it might be possible, under certain operative conditions, for the governor to hunt and open the switch 133 before completion of the gear shift operation.

In contemplation of such contingency the present invention embodies a holding circuit which is designed to circumvent the action resulting from any premature operation of the switch 133. In detail the holding circuit comprises the switch 138 which when closed, as shown in Fig. 13, permits the current to flow from the battery through the lines 103 and 111, the switch 110, the line 112, the switch 113 through the line 140, the switch 138 and the line 109, thereby retaining the energization of the solenoid 137 irrespective the position of the switch 133.

During the gear shift operation from high to low the cam 127 is readjusted and the circuit broken through the switches 131 and 138, thus causing de-energization of the solenoid 137 and restoration of the ignition circuit. It will be noted that when the switches 131 and 138 are open no current is flowing through the switch 133.

As illustrated in Fig. 12, the line 114 may be connected with a magnet 150 normally energized during the operation of the engine. The pole of the magnet is arranged for engagement with a lever 151 pivotally connected with a link 152 coupled with a lever 153 mounted on the shaft of a butterfly valve 154 in the carburetor intake manifold 155. The opposed end of the lever 151 is provided with a contractile spring 156 arranged to draw the lever away from the magnet 150. As the circuit in the line 114 is interrupted the magnet 150 will be de-energized, whereupon the spring 156 will retract the lever 151, thus moving the butterfly valve 154 to the throttled or engine idling position indicated by dotted lines.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a fluid transmission embodying a pump, a turbine driven thereby, a driven member and a clutch for uniting the turbine with the driven member, mechanism for operating said clutch comprising a differential gear unit driven by the pump and the turbine, an electric switch actuated thereby, a second differential gear unit driven by the turbine and driven member, a second electric switch actuated thereby and mechanism controlled by said switches for actuating the clutch.

2. In a fluid transmission including a prime mover, a turbine and a driven element, mechanism for synchronizing the turbine and driven member comprising a differential gear unit driven from said prime mover and said turbine, a governor driven by said unit at the speed difference between the prime mover and the turbine, an electric switch operatively connected with said governor and mechanism controlled by said switch for momentarily interrupting the operation of the prime mover.

3. In a fluid transmission embodying a driving member, a turbine and a driven member, mechanism for synchronizing the turbine and driven member comprising a differential gear unit driven by the driving member and turbine, a governor driven by said gear unit at the speed difference between the driving member and turbine, an electric switch operatively connected with said governor and a fluid operated brake controlled by said switch for retarding the movement of the turbine.

4. In a motor vehicle including an engine, a turbine driven thereby, a driven shaft, and a constant mesh gear train intermediate said turbine and driven shaft, mechanism for driving the driven shaft comprising a sliding clutch for power transmission from the turbine to the driven shaft, an overrunning clutch in said gear train for power transmission through the gear train when the sliding clutch is disconnected from the turbine, a differential gear unit driven by the engine and turbine at the differential speed thereof, a governor driven by said gear unit, an electric switch operated by said governor and a fluid operated piston connected to said clutch and operatively controlled by said switch.

5. In a motor vehicle embodying an engine, a turbine driven thereby, a driven member having a sliding clutch thereon and a gear train intermediate the turbine and driven member, mechanism for synchronizing the turbine and driven member and sliding the clutch into driving engagement with the turbine, a governor driven by the speed difference between the engine and turbine, an electric switch actuated thereby, a second switch associated with said governor, a throttle on said engine, mechanism controlled by the first and second named switches for actuating said throttle, a second governor driven by the speed difference between the turbine and driven member, a third switch actuated thereby, and mechanism controlled by the third named switch for actuating said clutch.

6. In a motor vehicle embodying an engine, a turbine driven thereby, a propeller shaft having drive gears associated therewith and a clutch intermediate said turbine and propeller shaft, mechanism for shifting said clutch, comprising a manually operable gear shift lever, an electric switch actuated thereby when the lever is adjusted to forward driving position, a governor driven by the difference in the speed between the engine and turbine, a second electric switch actuated by said governor and controlled by the first named switch, a fluid operated piston operatively connected with said clutch, a third switch, a solenoid for the actuation thereof, connected with the first and second named switches, a valve associated with said fluid actuated piston and a second solenoid operatively connected with said valve and controlled by the third named switch when the first named switch is closed.

7. In a motor vehicle including an engine, a turbine having a gear thereon, and a driven member having a slidable clutch member thereon, mechanism for shifting said clutch member, comprising a gear shift lever, an electric switch closed thereby when the lever is adjusted for forward drive, a second slidable clutch a fluid actuated piston associated with the last named slidable clutch, a second switch operated thereby, a speed responsive mechanism driven by the engine and turbine at the speed difference thereof, a third switch associated therewith and operated thereby, a fourth switch in the engine ignition circuit for opening and closing said circuit, an electrically operated valve associated with said fluid actuated piston and a fifth switch actuated simultaneously with the fourth named switch and controlled by the first named switch for controlling the operation of said electrically operated valve.

8. In a motor vehicle embodying an engine, a turbine driven thereby having change speed gears associated therewith, and a driven member, mechanism for driving said driven member, comprising a clutch intermediate said turbine and driven member, a governor driven at the speed difference between the engine and turbine, a switch closed by said governor when the speed difference between the engine and turbine reaches a predetermined minimum, a second switch closed by said governor when the speed difference between the engine and turbine reaches a predetermined maximum, mechanism controlled by said switches and associated with said clutch for the actuation thereof, the first named switch controlling the movement of the clutch into position for engaging the turbine with the driven member, the second named switch controlling the movement of the clutch into position for disengaging the turbine with the driven member.

9. In a fluid transmission embodying a pump, a turbine, a driven member, and a clutch intermediate said turbine and said driven member, mechanism for shifting said clutch, comprising a differential gear unit driven by the pump and turbine and depending upon the difference in their speeds, a switch opened and closed thereby, a fluid actuated piston associated with said clutch, a second switch actuated thereby and means controlled by the first and second named switches for controlling said fluid actuated piston.

10. In a motor vehicle including an engine, a turbine driven thereby and a propeller shaft, mechanism for synchronizing and coupling the turbine with the propeller shaft, comprising a clutch associated with said propeller shaft, a fluid responsive device coupled therewith for the actuation thereof, a switch associated with said fluid responsive device, a governor driven by the engine and turbine at the speed difference thereof, a second switch associated therewith, mechanism for momentarily interrupting the engine ignition circuit controlled by the first and second named switches, a second governor driven by the turbine and propeller shaft at the speed difference thereof, a third switch associated therewith and electrically coupled with said fluid responsive device, and a fourth switch controlled by the first, second and third named switches for the control of said fluid responsive device.

11. In a motor vehicle embodying an engine and a propeller shaft, a transmission therefor comprising a hydraulic torque converter, including a pump, turbine and reaction member operatively connected with the engine, a change speed gear train connected with the turbine, a clutch for coupling said gear train with the propeller shaft, a second clutch keyed to the propeller shaft and engageable with the turbine, a third clutch in said gear train arranged to cause one of the gears therein to override another of the gears when the second named clutch is engaged with the turbine, mechanism for shifting the second named clutch, a speed responsive mechanism driven by the turbine and propeller shaft and operable at a predetermined rate of the speed difference for controlling the operation of said mechanism for shifting the clutch, and means operable by the first named clutch for controlling the operation of said speed responsive mechanism.

12. In a motor vehicle embodying an engine, a turbine driven thereby having a gear thereon, and a propeller shaft having reduction gears entrained with said turbine gear and said propeller shaft, means for automatically and selectively coupling said turbine gear with said propeller shaft or with said reduction gears, comprising a clutch coupled with said propeller shaft and slidably engageable with the turbine gear, an overriding clutch associated with said propeller shaft reduction gears and said turbine gear, a governor driven by the turbine and propeller shaft at the speed difference thereof, mechanism controlled by said governor for coupling the first named clutch with the turbine gear when the speed of the propeller shaft and turbine are equal, a second governor driven by the engine and turbine at the speed difference thereof and mechanism controlled by said second governor for uncoupling said first named clutch with said turbine gear when the speed difference between the engine and turbine reach a predetermined maximum.

13. In a motor vehicle embodying an engine, a turbine driven thereby, and a propeller shaft having reduction gears entrained therewith, means for interconnecting said turbine with the propeller shaft under low torque and interconnecting said turbine with said reduction gears under high torque comprising a clutch keyed to said propeller shaft and engageable with said turbine, mechanism for shifting said clutch into and out of engagement with said turbine, an overrunning clutch associated with said turbine and said reduction gears, mechanism driven by the turbine and propeller shaft controlling the operation of the first named clutch shifting mechanism into turbine engaging position when the speed of the turbine and propeller shaft are equal, and mechanism driven by the engine and turbine controlling the operation of said first named clutch shifting mechanism into turbine disengaging position when the speed of the turbine and engine reach a predetermined speed difference.

14. In a motor vehicle embodying an engine, a turbine driven thereby, a propeller shaft having a gear thereon, and a change speed gear train intermediate said turbine and the propeller shaft gear, automatic coupling means for driving said propeller shaft directly from said turbine or through said gear train, comprising a clutch keyed for sliding movement on said propeller shaft, mechanism controlled by the speed of the propeller shaft and the speed of the turbine for sliding the clutch into engagement with the turbine when the speeds of the turbine and propeller shaft are equal, mechanism controlled by the speed of the engine and speed of the turbine for sliding the clutch out of engagement with the turbine when the speeds of the turbine and engine reach a predetermined speed difference and a second clutch associated with the change speed gear train arranged to transmit power from the turbine to the propeller shaft when the first named clutch is disengaged from the turbine and to overrun when the first named clutch is engaged with the turbine.

15. In a motor vehicle embodying an engine, a turbine driven thereby, a propeller shaft, a clutch intermediate the turbine and propeller shaft and reduction gearing entrained with the turbine and propeller shaft, mechanism for the operative connection of said clutch with said turbine comprising a fluid operated clutch actuating mechanism for holding the clutch in interengaged relation with the turbine, a spring in said fluid operated clutch actuating mechanism normally urging the clutch into disengaged relation with the turbine, a source of pressure fluid, a valve intermediate said clutch actuating mechanism and said source of pressure fluid, mechanism controlled conjointly by the turbine and propeller shaft for opening said valve, mechanism controlled conjointly by the engine and turbine for closing said valve, a drive gear on the propeller shaft interengaged with the reduction gearing and a second clutch associated with the reduction gearing arranged to overrun said propeller shaft drive gear when the first named clutch is engaged with the turbine.

16. In combination with an internal combustion engine, a fluid transmission including a turbine, a driven member and a clutch, mechanism for synchronizing said turbine and driven member and shifting said clutch comprising a differential gear unit connected with the engine and the turbine, a governor driven by said differential gear unit at the speed difference between the engine and turbine, an electric switch actuated by said governor, a second switch in the engine ignition circuit, a solenoid for actuating said second named switch controlled by the first named switch, a brake associated with said turbine, a third switch connected with said brake, mechanism for actuating said brake, a second solenoid controlled by the last named switch for the operative control of the mechanism for actuating the brake, means associated with the first named solenoid for opening the third named switch, a fluid operated piston for actuating said clutch, a third solenoid for the operative control thereof, a second differential gear unit connected with the turbine and driven member, a second governor driven by said differential gear unit at the speed difference between the turbine and driven member, and a fourth switch actuated by the last named governor and controlled by the first named switch for the operative control of said third named solenoid.

17. In a fluid transmission embodying a driving member, a turbine and a driven member, mechanism for synchronizing the turbine and the driven member comprising a gear unit driven by the driving member and turbine at the differential speed thereof, an electric switch associated therewith and operated thereby, means controlled by said switch for momentarily interrupting the operation of the driving member, a second gear unit driven by the turbine and driven member at the differential speed thereof, an electric switch associated therewith and operated thereby, a brake controlled by the first named switch for retarding the movement of the turbine, and mechanism controlled by the last named switch to release said brake.

18. In combination with an internal combustion engine, a fluid transmission including a turbine, a driven member and a clutch, mechanism for synchronizing said turbine and driven member and shifting said clutch comprising a differential gear unit connected with the engine and the turbine, a governor driven by said differential gear unit at the speed difference between the engine and turbine, an electric switch actuated by said governor, a second switch in the engine ignition circuit, a solenoid for actuating said second named switch controlled by the first named switch, a brake associated with said turbine, mechanism for controlling the actuation of said brake, a third switch electrically connected with the first named switch and said controlling mechanism and means for actuating said clutch when said turbine and driven member are synchronized.

19. In a fluid transmission embodying a driving element, a turbine having a clutch member thereon and a driven element having a clutch member thereon, mechanism for synchronizing and engaging said clutch members comprising a pair of speed responsive devices coupled respectively with said driving element and turbine and said driven element and turbine and driven at the speed difference thereof, mechanism operatively controlled by one of said speed responsive mechanisms for reducing the speed of said turbine, and mechanism operatively controlled by the other of said speed responsive devices for engaging said clutch members.

20. The combination of a hydraulic torque converter embodying a turbine shaft with a gear transmission embodying a driven shaft, a clutch for coupling said turbine shaft with said driven shaft, speed responsive means coupled with said turbine shaft and said driven shaft, an electric switch controlled thereby, mechanism for actuating said clutch controlled by said switch, a second clutch for driving the driven shaft when the first named clutch is disengaged with the turbine shaft, and a second electric switch associated with the first named clutch for making and breaking the electric circuit to the first named switch.

21. In a motor vehicle including an engine, a propeller shaft, a fluid transmission and a mechanical transmission, a clutch for coupling said fluid transmission with said propeller shaft, a second clutch for coupling said fluid transmission with said propeller shaft when the first named clutch is disengaged, a third clutch in said mechanical transmission for driving said propeller shaft at a lower rate of speed when the first named clutch is disengaged with said fluid transmission, differential gear units interconnected with the engine and propeller shaft, an electric switch controlled thereby, mechanism for actuating the first named clutch controlled by said switch and a second switch associated with the third named clutch for controlling the circuit leading to the first named switch.

22. In a fluid transmission embodying a turbine, a turbine shaft, a gear train and a driven shaft in said gear train, mechanism for coupling said shafts, comprising clutch elements on said shafts, a piston interlinked with the clutch element on said driven shaft, a differential gear unit driven by said shafts, an electric switch controlled thereby, fluid means for actuating said piston and a valve controlled by said switch for the control of the fluid means.

RENKE BRUNKEN.